(12) United States Patent
Hao

(10) Patent No.: US 12,514,981 B2
(45) Date of Patent: Jan. 6, 2026

(54) INJECTION DEVICE

(71) Applicant: Yunling Hao, Shenzhen (CN)

(72) Inventor: Yunling Hao, Shenzhen (CN)

( * ) Notice: Subject to any disclaimer, the term of this patent is extended or adjusted under 35 U.S.C. 154(b) by 975 days.

(21) Appl. No.: 17/641,191

(22) PCT Filed: Sep. 9, 2019

(86) PCT No.: PCT/CN2019/104912
§ 371 (c)(1),
(2) Date: Mar. 8, 2022

(87) PCT Pub. No.: WO2021/046680
PCT Pub. Date: Mar. 18, 2021

(65) Prior Publication Data
US 2022/0339357 A1    Oct. 27, 2022

(51) Int. Cl.
*A61M 5/20*    (2006.01)
*A61M 5/42*    (2006.01)
*A61M 5/46*    (2006.01)

(52) U.S. Cl.
CPC .............. *A61M 5/20* (2013.01); *A61M 5/425* (2013.01); *A61M 5/46* (2013.01)

(58) Field of Classification Search
CPC .......... A61M 5/20; A61M 5/425; A61M 5/46; A61M 2005/206; A61M 2205/583
See application file for complete search history.

(56) References Cited

U.S. PATENT DOCUMENTS

2004/0092875 A1 *    5/2004    Kochamba ............ A61M 37/00
604/146

FOREIGN PATENT DOCUMENTS

| CN | 201244255 Y | 5/2009 |
|---|---|---|
| CN | 103796696 A | 5/2014 |
| CN | 104645459 A | 5/2015 |
| CN | 205287136 U | 6/2016 |
| CN | 207384563 U | 5/2018 |
| WO | 2010016635 A1 | 2/2010 |

OTHER PUBLICATIONS

International Search Report in corresponding PCT Application No. PCT/CN2019/104912 dated May 27, 2020 (2 pages).

* cited by examiner

*Primary Examiner* — Tasnim Mehjabin Ahmed
(74) *Attorney, Agent, or Firm* — Birchwood IP

(57) ABSTRACT

This disclosure relates to an injection device, which is configured to be loaded with a syringe including an injection container and a needle, or loaded with an injection container and a needle. The injection device includes: an injection site gripper configured to grip an epidermis and subcutaneous tissue at an injection site; and a main machine coupled to the injection site gripper and configured to automatically perform an injection process at the gripped injection site. The injection device may grip the epidermis and subcutaneous tissue at the injection site, so that the needle penetrates to such a depth that does not enter the muscular tissue, thereby facilitating injection and reducing the user's pain. In addition, the injection device can automatically perform the injection process, which reduces the difficulty of operation and enables the user with insufficient injection experience to perform the injection process conveniently and efficiently.

19 Claims, 10 Drawing Sheets

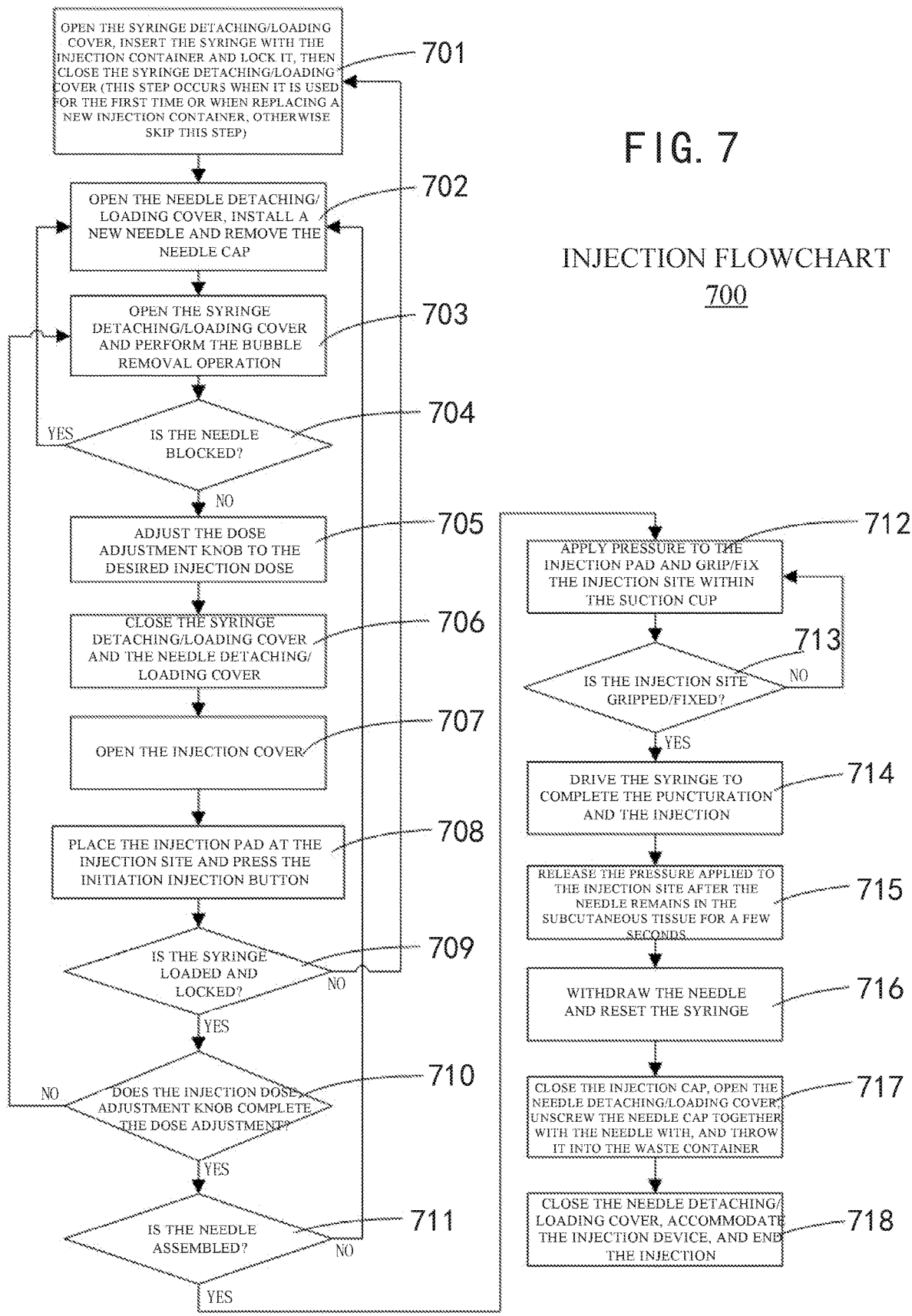

INJECTION DEVICE

CROSS-REFERENCE OF RELATED APPLICATION

The present application a is U.S. national phase application of PCT/CN2019/104912, filed Sep. 9, 2019, under 35 U.S.C. 371. The entire content of the PCT application is incorporated by reference herein.

TECHNICAL FIELD

The present disclosure relates to an injection device, and particularly, involves to an injection device used with a syringe or with an injection container and a needle.

BACKGROUND

China is the country with the largest number of diabetic patients in the world, and the number of people suffering from the disease is increasing year by year. Currently, there are 110 million diabetic patients in China, up from 90 million in 2011. According to the prediction by WHO, the number of diabetic patients in China will increase from the current 110 million to 150 million by 2040, unless urgent action is taken to reduce lifestyle-related risk factors, such as unhealthy diet, as well as sedentary and physical inactivity. At the same time, China is also the country with the largest number of deaths from diabetes, mainly because the treatment and control rates of diabetics in China are very low. According to the survey data of the Diabetes Branch of the Chinese Medical Association, among diabetic patients who have been treated with insulin in China, the blood glucose compliance rate is only 37%. Irregular injection techniques and irregular injection of insulin without doctors' advice are the main causes for the low rate of blood glucose control compliance in diabetic patients in China.

Diabetic patients have relatively insufficient insulin secretion or insulin resistance, so it is necessary to use insulin therapy in early stages. By injecting insulin, hypofunctional islet B cells may have a temporary alleviation on its workload, just as a person needs to rest when being sick. Some diabetics will recover the function of islet cells to a certain extent after a period of treatment, and some diabetics can even reduce or stop insulin injections. Insulin therapy can both lower blood glucose and avoid the toxicity of oral drugs to the liver and kidneys, reducing or delaying the occurrence of complications.

With the continuous development of technology, the use of insulin pens has become more and more convenient, the needles have become thinner, the pain of injections has become less and less, and the cost has become lower and lower. Even so, the vast majority of diabetic patients still prefer administration of hypoglycemic drugs to control blood glucose to injection of insulin, which is mainly due to the following two reasons. On one hand, patients have phobia of needles, and diabetic patients need to perform subcutaneous injections for 1 to 4 times a day, so the pain and fear of each injection make many diabetic patients discouraged from insulin injection; on the other hand, the insulin injection requires high standardization of operation by insulin pen, but many middle-aged and elderly diabetic patients have difficulty in completing precise operations due to poor eyesight, so they are not able to independently use insulin injection pen to complete injection. In addition, the thickness of the subcutaneous tissue in different sites of the human body is different, and therefore the injection method is also different. If the injection method is not standardized, it will not only increase the pain of injection, but also may lead to inaccurate injected dose of insulin, resulting in large blood glucose fluctuations and early complications.

In addition to insulin injections, the above problems also exist in other frequent subcutaneous injection operations.

SUMMARY

Therefore, there is a need for an injection device to solve the above problems in the prior art. This disclosure intends to provide an injection device, which can be used in conjunction with a syringe including an injection container and a needle or in conjunction with an injection container and a needle, and can grip the epidermis and subcutaneous tissue at the injection site, so that the puncture depth of the needle enter the muscular tissue as less as possible, thereby facilitating injection and reducing the user's pain. The injection device can also automatically perform the injection process, which reduces the difficulty of operation and enables the user with insufficient injection experience to perform the injection process conveniently and efficiently.

According to a first aspect of the present disclosure, an injection device is provided, which is configured to be loaded with a syringe including an injection container and a needle, or loaded with an injection container and a needle. The injection device may comprise an injection site gripper and a main machine. The injection site gripper may be configured to grip an epidermis and subcutaneous tissue at the injection site. The main machine may be coupled to the injection site gripper and configured to automatically perform an injection process on the gripped injection site.

In some embodiments, the injection site gripper may comprise at least one of a negative pressure suction mechanism and a mechanical compression mechanism, an accommodating portion and a height restriction portion. The accommodating portion may be configured to accommodate and grip the epidermis and subcutaneous tissue at the injection site by the at least one of the negative pressure suction mechanism and the mechanical compression mechanism, and provided with an opening to expose at least a portion of the accommodated and gripped epidermis and subcutaneous tissue at the injection site. The height restriction portion may be configured to restrict a height of the exposed at least a portion of the epidermis and subcutaneous tissue at the injection site.

In some embodiments, in a case where the injection site gripper comprises at least the negative pressure suction mechanism, the injection device further comprises a pressure detector configured to detect a pressure applied by the injection site gripper on the injection site.

In some embodiments, the main machine may further comprise a micro-controller unit. The micro-controller may be configured to receive a signal from the pressure detector indicating magnitude of the pressure, and send a pressure maintenance signal to the injection site gripper when the pressure is within a preset range.

In some embodiments, in a case where the injection site gripper comprises at least the negative pressure suction mechanism, the accommodating portion may be disc-shaped and have an arched cross-section. The height restriction portion may be provided at the outside of the opening, and/or the height restriction portion may include a transversal extending portion.

In some embodiments, in a case where the injection site gripper comprises at least the negative pressure suction mechanism, the injection device further comprises a needle sealing mechanism configured to seal between the needle and the injection site gripper.

In some embodiments, the main machine may further comprise a first driving mechanism, a second driving mechanism, and a micro-controller unit. The first driving mechanism may be configured to drive an injection in response to an injection driving signal. The second driving mechanism may be configured to drive the needle to puncture into the injection site in response to a puncture driving signal. The micro-controller unit may be configured to receive a signal from the pressure detector indicating magnitude of a pressure. When the pressure is in a preset range, the micro-controller unit may send the puncture driving signal to the second driving mechanism and then the injection driving signal to the first driving mechanism.

In some embodiments, the syringe or the main machine may be provided with a dose adjustment mechanism. The main machine may further comprise a dose adjustment detection mechanism, which is configured to detect an operation status of the dose adjustment mechanism and send a corresponding dose adjustment indication signal. Wherein, the micro-controller unit may be further configured to receive the dose adjustment indication signal, and allow actuation of the injection site gripper to perform gripping in a case where the dose adjustment indication signal indicates that a dose adjustment has been made.

In some embodiments, the first driving mechanism may be coupled to the dose adjustment mechanism provided on the syringe or the main machine, and the operation status of the dose adjustment mechanism may include whether the dose adjustment has been made, whether the needle is blocked, and whether the dose adjustment mechanism is pushed back to a zero position.

In some embodiments, the main machine may further comprise an in-situ detection mechanism. The in-situ detection mechanism may be configured to detect whether the syringe and the needle are assembled in place in a case where the injection device is configured to be loaded with the syringe and the needle, detect whether the injection container and the needle are assembled in place in a case where the injection device is configured to be loaded with the injection container and the needle, and send a corresponding in-situ detection signal. Wherein, the micro-controller unit may be configured to receive the in-situ detection signal and allow actuating the injection site gripper to perform gripping in a case where the in-situ detection signal indicates that the assembly is in place.

In some embodiments, the main machine may further comprise an injection button, which may be configured to send an initiation signal when pressed. Wherein, the micro-controller unit may be further configured to actuate the dose adjustment detection mechanism and the in-situ detection mechanism to perform detection upon receiving the initiation signal, and actuate the injection site gripper to perform gripping in a case where the in-situ detection signal indicates that the assembly is in place meanwhile the dose adjustment indication signal indicates that a dose adjustment has been made.

In some embodiments, the micro-controller unit may be configured to send the puncture driving signal to the second driving signal in response to the initiation signal in a case where the injection site satisfies a puncture initiation condition.

In some embodiments, the puncture initiation condition may include at least one of the following: in a case where the injection site gripper comprises at least a negative pressure suction mechanism, pressure within the injection site gripper is within a preset range and is able to be maintained; in a case where the injection site gripper comprises only, a mechanical compression mechanism, the mechanical compression mechanism completes the gripping at the injection site.

In some embodiments; the second driving mechanism may be further configured to drive the needle to reset in response to a reset driving signal. The micro-controller unit may be further configured to actuate the injection site gripper to perform release in a case where an injection end condition is satisfied, and then send the reset driving signal to the second driving mechanism.

In some embodiments; the injection end condition includes at least one of injection success complete condition and injection failure terminate condition. Wherein, the injection success complete condition includes at least one of the following: the dose adjustment mechanism returns to a zero position after completing the injection of set dose; the time period during which the needle resides in the subcutaneous tissue reaches a set threshold. And the injection failure terminate condition includes at least one of the following: the injection of set dose is terminated due to the blockage of the needle or lack of the residual medicament, grip failure at the injection site during injection.

In some embodiments, in a case where the injection device is configured to be loaded with the syringe and the needle, the injection device may further comprise a first lid, a second lid and a third lid detachably coupled to the main machine. The first lid may be configured to load the syringe into the main machine in a detached state. The second lid may be configured to load or remove the needle in the detached state. And the third lid may be configured to be detachably coupled to a side of the second lid opposite the first lid, and to expose the accommodating portion of the injection site gripper in the detached state.

In some embodiments, in a case where the injection device is configured to be loaded with the injection container and the needle, the injection device may further comprise a second lid and a third lid each detachably coupled to the main machine. Wherein, the second lid may be configured to load or remove the injection container and the needle in a detached state. The third lid may be configured to be detachably coupled to a side of the second lid opposite the main machine, and to expose the accommodating portion of the injection site gripper in the detached state.

In some embodiments, in a case where the injection site gripper comprises at least the negative pressure suction mechanism, the second lid is provided a needle sealing mechanism and the injection site gripper therein. When closing the second lid, the needle may be air-tightly mounted to the needle sealing mechanism so as to achieve an airtight seal of the needle relative to the injection site gripper.

With the injection device according to various embodiments of the present disclosure, it can be used in conjunction with a syringe including an injection container and a needle or an injection container and a needle, which facilitates the puncture of the needle, reduces the user's pain. The automated injection process reduces the dependence on the user's experience, ensures that the injection process can be performed conveniently and efficiently at each suitable injection site of the body, and is low in cost and easy to popularize.

BRIEF DESCRIPTION OF THE DRAWINGS

In figures that are not necessarily drawn to scale, the same reference signs may describe similar components in different figures. The same reference signs with suffixes or different suffixes may denote different examples of similar components. The figures generally show various embodiments by way of example rather than limitation, and are used together with the description and claims to describe the embodiments of the present disclosure. When appropriate, the same reference signs are used in all figures to refer to the same or similar parts. Such embodiments are illustrative, and are not intended to be exhaustive or exclusive embodiments of the present device or method.

FIG. 7 illustrates an exemplary injection flowchart using the injection device according to the embodiment of the present disclosure;

DETAILED DESCRIPTION

In order to enable those skilled in the art to better understand the technical solutions of the present disclosure, the present disclosure will be described in details below in conjunction with the accompanying drawings and specific embodiments. The embodiments of the present disclosure will be described in further details below in conjunction with the accompanying drawings and specific embodiments, but they are not intended to limit the present disclosure.

"First", "second" and similar words used in the present disclosure do not indicate any order, quantity or importance, but are only used to distinguish different components. "include" or "comprise" and other similar words means that an element appearing before this word covers an element listed after this word, but do not exclude other elements. "Up", "down", "left", "right", etc are only used to indicate the relative position relationship. When the absolute position of a described object changes, the relative position relationship may also change accordingly.

In the present disclosure, when it is described that a specific device is located between the first device and the second device, there may or may not be an interposed device between the specific device and the first device or the second device. When it is described that a specific device is coupled to another device, the specific device may be directly coupled to the other device without an interposed device, or may not be directly coupled to the other device but with an interposed device.

All terms (including technical terms or scientific terms) used in this disclosure have the same meaning as understood by those of ordinary skill in the art to which this disclosure belongs, unless otherwise specifically defined. Note that in this document, the technical term "syringe" refers to an injection device that does not include a needle, such as an insulin injection pen or the like that removes the needle. It should also be understood that terms such as those defined in general-purpose dictionaries should be interpreted as having meanings consistent with their meanings in the context of related technologies, and should not be interpreted in an idealized or extremely formal sense unless it is clearly defined as such herein.

The technologies, methods, and devices known to those of ordinary skill in the relevant fields may not be discussed in details, but where appropriate, the technologies, methods, and devices should be regarded as a part of the specification.

Figure 1:
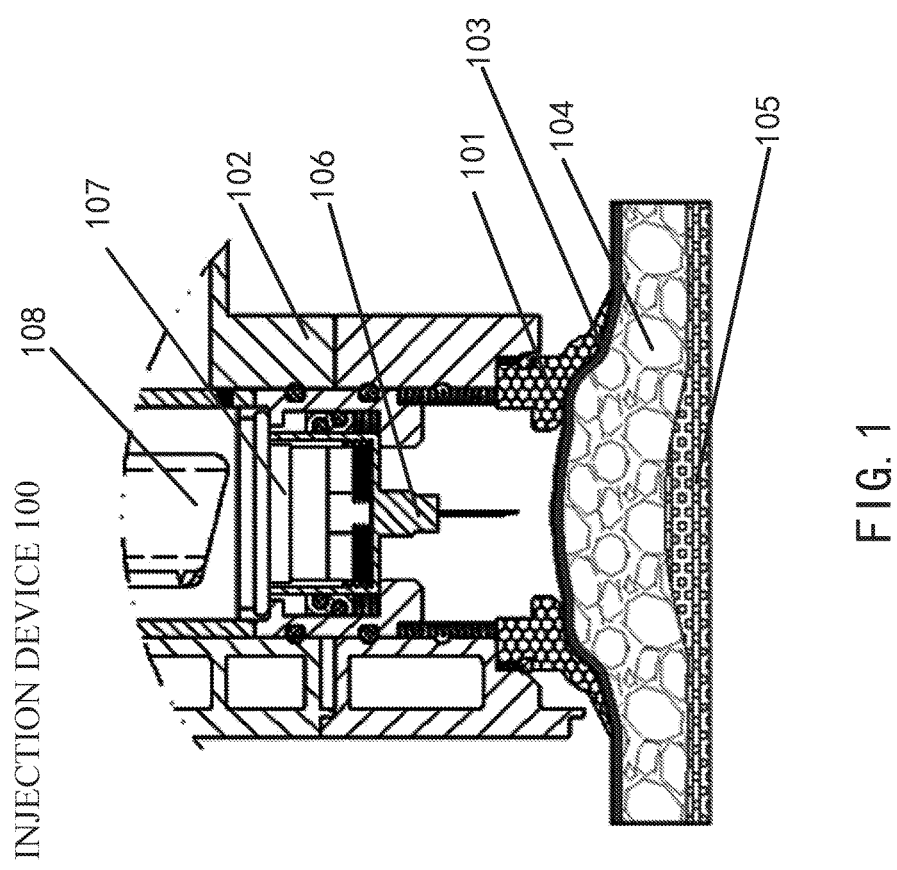
FIG. 1 shows a schematic diagram of an injection device according to an embodiment of the present disclosure.

FIG. 1 shows a schematic diagram of the injection device according to the embodiment of the present disclosure. As shown in FIG. 1, the injection device 100 is configured to be loaded with (e.g., enclose) a syringe 107 including an injection container 108 and a needle 106 or an injection container 108 (instead of the syringe 107) and needle 106. The injection device 100 includes an injection site gripper (fixer) 101 and a main machine 102. The injection site gripper 101 is configured to grip (fix and compress) the epidermis 103 and subcutaneous tissue 104 at the injection site. The main machine 102 (only a partial cross-sectional view of which is shown in FIG. 1) is coupled (or fixed) to the injection site gripper 101 and configured to automatically perform an injection process on the gripped injection site. The injection site gripper 101 can be placed at the injection site before injection, and can be used to apply external force to the injection site when the injection is to be initiated, so as to grip the epidermis 103 and subcutaneous tissue 104 at the injection site therein. As shown in FIG. 1, since the epidermis 103 and the subcutaneous tissue 104 are in a shallower position compared to a muscular tissue 105, with lower density and significant better flexibility and mobility compared to the muscular tissue 105. Therefore, under the external force of the injection site gripper 101, mainly the epidermis 103 and the subcutaneous tissue 104 enter the injection site gripper 101 and are gripped therein, while the muscular tissue 105 rarely enters the injection site gripper 101, so as to ensure that the puncture (penetration) depth of the needle 106 is restricted to the gripped subcutaneous tissue 104 instead of the muscular tissue 105, thereby facilitating the puncture of the needle 106 meanwhile significantly reducing the user's pain. Further, by gripping and compressing the epidermis 103 and subcutaneous tissue 104, their slippage and deformation during puncturing are reduced, enabling more precise control of the puncturing operation.

The injection site gripper 101 can be implemented in various manners.

Figures 2A, 2B:
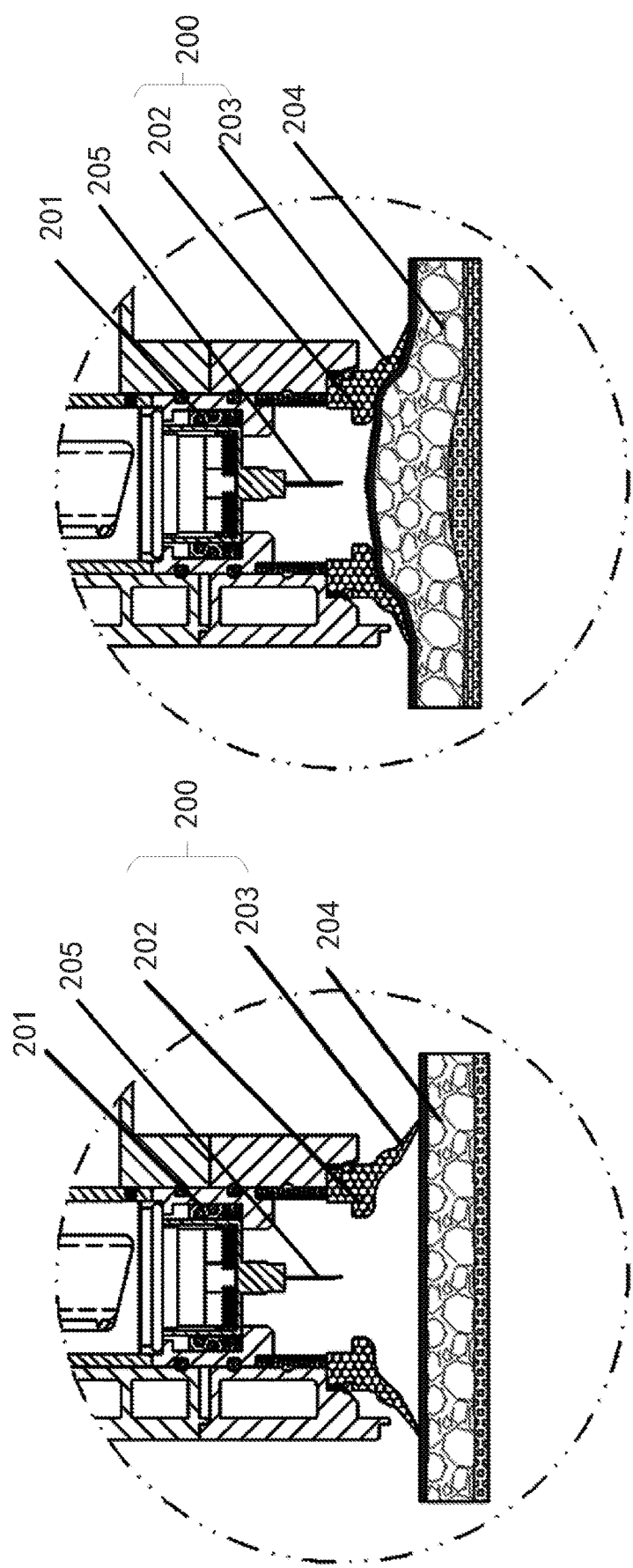
FIGS. 2(a) and 2(b) respectively show illustrations of a first example of an injection site gripper in the injection device according to the embodiment of the present disclosure in a natural state and a sucked status of the injection site.

As an example, the structure of the first example as shown respectively in FIG. 2(a) and FIG. 2(b) may be adopted. As shown in FIGS. 2(a) and 2(b), the injection site gripper 200 may include: a negative pressure suction mechanism (not shown) configured to generate negative pressure; an accommodating portion 203 configured to accommodate and grip the epidermis and subcutaneous tissue 204 at the injection site under the action of negative pressure and provided with an opening to expose at least a part of the accommodated and gripped epidermis and subcutaneous tissue 204 at the injection site; and a height restriction portion 202 configured to restrict the height of the exposed at least a portion of the epidermis and subcutaneous tissue 204 at the injection site. With the height restriction portion 202, it is possible to provide a margin for the raising of the epidermis and subcutaneous tissue 204 (as shown in FIG. 2(b)) under the action of negative pressure, so as to control the puncture depth more accurately, and prevent the needle 205 from inadvertently penetrating into the exposed epidermis and subcutaneous tissue 204 except for puncture and injection. That is to say, the needle 205 can only be able to actively and intentionally penetrate into the epidermis and subcutaneous tissue 204 to an appropriate depth, instead of "passively" penetrate therein due to the raising of the epidermis and subcutaneous tissue 204, thereby improving the safety of the injection process.

Figures 3A, 3B, 3C:
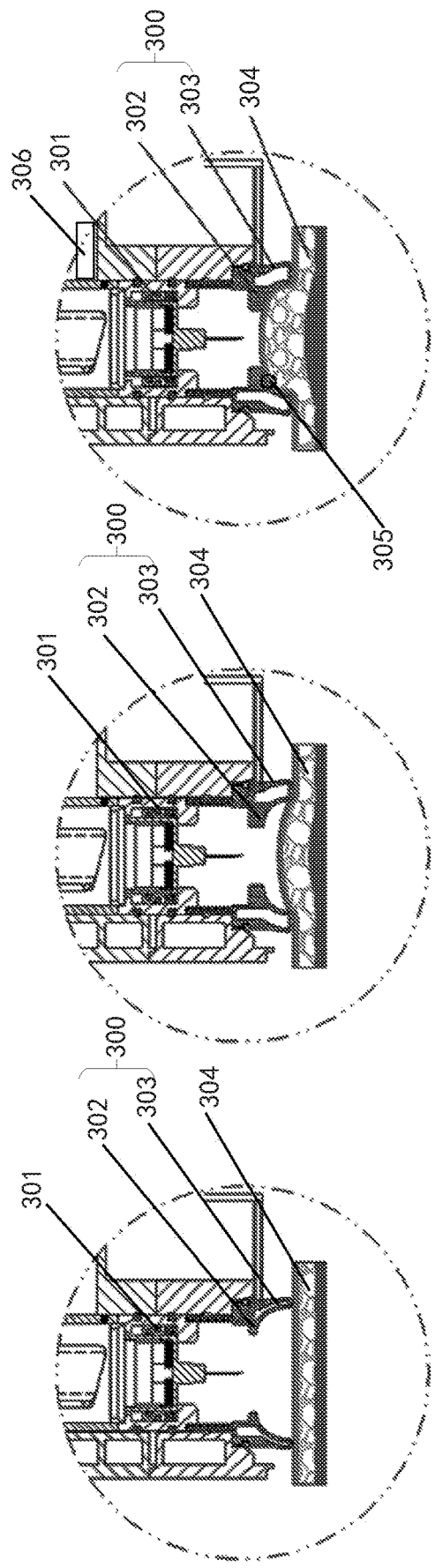
FIGS. 3(a), 3(b) and 3(c) respectively show illustrations of a second example of the injection site gripper in the injection device according to the embodiment of the present disclosure in the natural state, a compressed (i.e., squeezed) state and a compressed and sucked status of the injection site.

In addition to the negative pressure suction mechanism, the injection site gripper 101 may also adopt a mechanical compression mechanism, or also may combine the negative pressure suction mechanism and the mechanical compression mechanism (not shown). As shown in FIGS. 3(a), 3(b) and 3(c), the accommodating portion 303, the height restriction portion 302, the epidermis and subcutaneous tissue 304 may be similar to the accommodating portion 203, the height restriction portion 202, the epidermis and subcutaneous tissue 204 shown in FIGS. 2(a) and 2(b) respectively, which will not be repeated here. As shown in FIG. 3(a), the injection site gripper 300 may be placed at the injection site such that the end of the accommodating portion 303 contacts the epidermis. In some embodiments, the mechanical compression mechanism may be fixed to the accommodating portion 303 and configured to narrow (or tighten) the accommodating portion 303, as shown in FIG. 3(b), so as to apply pressure to the epidermis and subcutaneous tissue 304 accommodated in the accommodating portion 303. The negative pressure suction mechanism (not shown) is then activated to further accommodate and grip the epidermis and subcutaneous tissue 304 at the injection site under the action of negative pressure, as shown in FIG. 3(c). By combining the negative pressure suction and the mechanical compression, the injection site is easier to be gripped, and the applicability is better. The epidermis and subcutaneous tissue 304 entering the accommodating portion 303 are gathered first and then sucked and gripped by the negative pressure, and are subject to less pulling tension, which is more helpful for injection and significantly reduces the energy consumption of the negative pressure suction mechanism.

In some embodiments, in case where the injection site gripper 300 includes at least the negative pressure suction mechanism, the injection device may further include a pressure detector 305, which is configured to detect the pressure exerted by the injection site gripper 300 on the injection site. The pressure applied to the injection site can be monitored by a pressure detector 305 to ensure that the pressure is maintained within a suitable range, which will neither cause too high pressure, which may result in excessive tension in the subcutaneous tissue 304 within the injection site gripper 300, thereby hindering puncture and injection and affecting the accuracy of the injection dose, nor will the pressure be too low, which may result in relaxation of the subcutaneous tissue 304, thereby failing to precisely control the puncture depth.

In some embodiments, the main machine 102 may include a micro-controller unit 306, which may employ any one of a single chip microcomputer, a system on a chip (SOC), an application specific integrated circuit (ASIC), or a field programmable gate array (FPGA) and/or a combination thereof. The micro-controller unit 306 may be configured to: receive a signal from the pressure detector 305 indicating the magnitude of the pressure, and send a pressure maintenance signal to the injection site gripper 300 when the pressure is within a preset range. That is, the micro-controller unit 306 can autonomously evaluate the pressure the subcutaneous tissue 304 undergoes. If the pressure is within the preset range (that is, the pressure is appropriate), it is possible to instruct the injection site gripper 300 to maintain the current appropriate pressure via the pressure maintenance signal. In this manner, the pressure may be continuously and stably maintained within an appropriate range, allowing sufficient time for precise puncture and injection. In some embodiments, the micro-controller unit 306 may also issue instructions in real time to adjust the pressure to an appropriate range based on the pressure signal from the pressure detector 305. For example, if the pressure is too high, a pressure release signal is sent; if the pressure is too low, a pressure increase signal is sent, so as to dynamically (even in real time) adjust the tension of the subcutaneous tissue 304 and thus ensure precise control of the puncture depth and accuracy of the injection dose.

In some embodiments, the injection site gripper 101 may be configured as a silicone component, which is more comfortable in use and can better attach to the epidermis. As an example, in a case where the injection site gripper comprises at least the negative pressure suction mechanism, the accommodating portion 303 may be disk-shaped and have an arched cross-section, as shown in FIG. 3(b) and FIG. 3(c). The disc-shaped structure with the arched cross-section conforms to the shape of the epidermis and subcutaneous tissue 304 after being compressed (suctioned), thereby achieving better attachment and better gripping. As an example, the height restriction portion 302 may be provided at the outer side (periphery) of the opening (for the needle to penetrate), so as to avoid obstructing the penetration of the needle and exposing the injection site to a greater extent.

In some embodiments, the height restriction portion 302 may further include an inward extending portion (as shown in FIG. 3(a)-FIG. 3(c)), that is, the height restriction portion 302 may extend at least partially transversally (in a width or radial direction, note that the opening for needle penetration is located at the inside of the extending portion in a radial (or width) direction). The transversal extending portion may act as a baffle, which prevents the compressed/suctioned epidermis and subcutaneous tissue 304 from overflowing irregularly (e.g., intermittently) upwards, keeps the surface of the exposed portion flat, and reduces obstruction and interference with puncture, thereby enabling more precise control of the subcutaneous puncture depth.

In some embodiments, in a case where the injection site gripper includes at least the negative pressure suction mechanism (not shown), such as the injection site grippers 200 and 300, the injection device may also include a needle sealing mechanism, such as 201 or 301, which is configured to perform seal between the needle and the injection site gripper 200 or 300, thereby preventing air leakage and improving the efficiency of the negative pressure suction.

Figure 4:
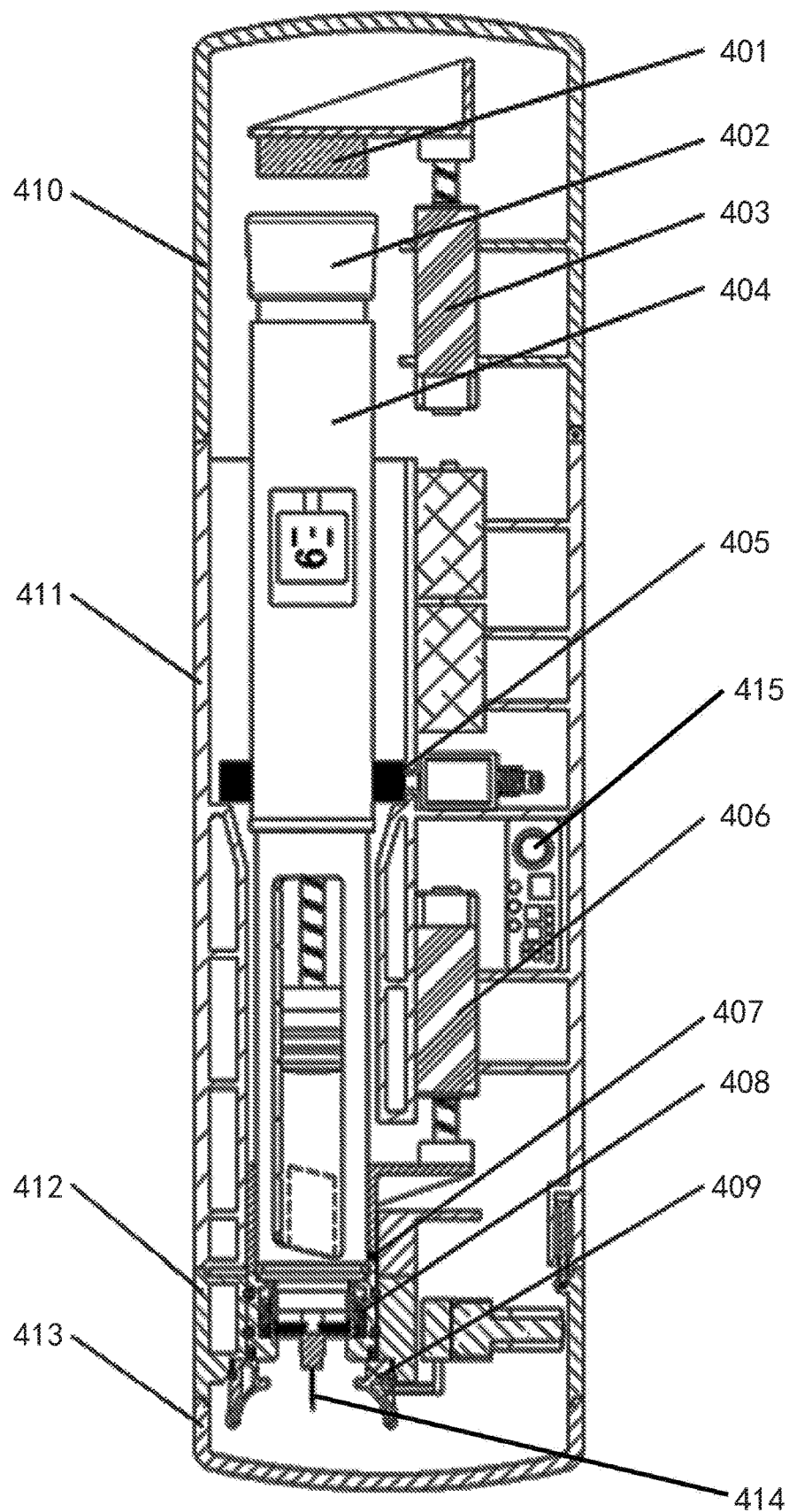
FIG. 4 shows a cross-sectional view of the injection device according to the embodiment of the present disclosure.

FIG. 4 shows a cross-sectional view of an injection device according to an embodiment of the present disclosure. Note that in FIG. 4 the injection device is loaded with a syringe 404 and a needle 414, but this is only an example, and in other embodiments an injection container and the needle 414 may also be loaded, which will be applicable after minor changes to related components.

As shown in FIG. 4, the main machine 411 may include a first driving mechanism 403 and a second driving mechanism 406. The first driving mechanism 403 is configured to drive (e.g., the syringe 404) to inject in response to an injection driving signal. The second driving mechanism 406 is configured to drive the needle 414 to puncture into the injection site in response to a puncture driving signal. And the main machine 411 may also include a micro-controller unit 415. The micro-controller unit 415 may be configured to receive a signal from the pressure detector (not shown) indicating the magnitude of the pressure, and send a puncture driving signal to the second driving mechanism 406 and then an injection driving signal to the first driving mechanism 403 when the pressure is within the preset range. In this manner, the micro-controller unit 415 may be used to monitor the pressure applied to the injection site in real time. When the pressure is appropriate, that is, when the pressure is not too high, too high pressure may result in excessive tension in the subcutaneous tissue within the injection site gripper 409 or even hinder puncture and injection or affect the accuracy of the injection dose, nor too low, too low pressure may result in the relaxation of the subcutaneous tissue and thus fail to precisely control the puncture depth, the first driving mechanism 403 and the second driving mechanism 406 are automatically controlled to perform the puncturing and injecting operations sequentially without manual intervention. In some embodiments, the second driving mechanism 406 may drive the needle 414 into the subcutaneous tissue to a suitable depth, so as to avoid penetrating into the muscular tissue resulting in obstructed penetration and pain.

In some embodiments, the syringe 404 may be provided with a dose adjustment mechanism (e.g., an adjustment knob) 402 and the user may rotate the dose adjustment mechanism 402 to preset a dose to be injected. In a case of loading the injection container and the needle 414, the dose adjusting mechanism 402 can also be provided on the main machine 411 instead. The main machine 411 may further comprise a dose adjustment detection mechanism 401, which is configured to detect the operation status of the dose adjustment mechanism 402, and send a corresponding dose adjustment indication signal. As an example, the dose adjustment detection mechanism 401 may be implemented by means of pressure sensitive element. Wherein, the micro-controller unit 415 is further configured to receive the dose adjustment indication signal, and in the case where the dose adjustment indication signal indicates that a dose adjustment has been made, allow actuation of the injection site gripper 409 to perform gripping. It is to be noted that the expression "in the case where . . . , allowing" in various places herein intends to mean that confirmation on the dose adjustment already made may be a sufficient condition for actuating the injection site gripper 409. In some embodiments, it may be only used as a necessary condition for actuating the injection site gripper 409. For example, only when several other conditions are also satisfied (including but not limited to the fact that the syringe 404 and the needle 414 are assembled in place, and the user presses an injection button so that an injecting initiation signal is sent to the micro-controller 415, etc.), the injection site gripper 409 is actuated to perform gripping.

In some embodiments, by means of the dose adjustment detection mechanism 401, the micro-controller unit 415 can autonomously identify whether the user has completed the injection dose adjustment; if not, no injection steps are initiated, such as, but not limited to, injection site gripping, but a visual or audible prompt is given to remind the user to adjust the injection dose. In this way, it is possible to avoid invalid or erroneous injection site gripping, puncturing and injecting operations without a preset injection dose, thereby saving energy consumption and improving safety.

In some embodiments, the first driving mechanism 403 may be coupled to the dose adjustment mechanism 402 of the syringe 404. In this manner, as the first driving mechanism 403 drives the dose adjustment mechanism 402 of the syringe 404, the dose adjustment mechanism 402 will push the piston in the injection container, and accordingly inject the medicament in the injection container into the subcutaneous tissue. When the preset injection dose is injected into the subcutaneous tissue, the dose adjustment mechanism 402 correspondingly returns to the zero position. In some embodiments, the dose adjustment mechanism 402 can be provided on the main machine 411 instead of the syringe 404, and the first driving mechanism 403 can be coupled to the dose adjustment mechanism 402 provided on the main machine 411.

As an example, when the dose adjustment mechanism 402 is stuck in some non-zero position, the needle 414 is likely to be blocked. In some embodiments, the (operation) states of the dose adjustment mechanism 402 is not limited to whether a dose adjustment has been made, but may also include whether the needle 414 is blocked and/or whether the dose adjustment mechanism 402 is pushed back to the zero position, and the dose adjustment indication signal can also reflect these operation states accordingly. The micro-controller unit 415 may send corresponding control instructions to control corresponding components to perform corresponding operations according to the specific operation state. For example, with a status indicator on the exterior of the injection device, it is possible to alert that the needle 414 is blocked or that the injection is complete, the injection site gripper 409 may be actuated to release pressure, then a reset drive signal may be sent to the second driving mechanism 406 to perform a needle withdrawal operation, and so on. In some embodiments, the injection end condition may be used as a premise for pressure release by the injection site gripper 409. Particularly, the injection end condition may include at least one of injection success complete condition and injection failure terminate condition. As an example, the injection success complete condition includes at least one of the following: the dose adjustment mechanism returns to a zero position after completing the injection of set dose; the time period during which the needle resides in the subcutaneous tissue reaches a set threshold. Besides, the injection failure terminate condition includes at least one of the following: the injection of set dose is terminated due to the blockage of the needle or lack of the residual medicament, grip failure at the injection site during injection (e.g., due to lack of the negative pressure within the suction pad-type injection site gripper 409).

In some embodiments, the main machine 411 may further include an in-situ detection mechanism 407 which is configured to detect whether the syringe 404 and the needle 414 are assembled in place in the case where the injection device is configured to load the syringe 404 and the needle 414

(detect whether the injection container and the needle are assembled in place in the case where the injection device is configured to load the injection container and the needle), and send a corresponding in-situ detection signal. Wherein, the micro-controller unit 415 may be configured to receive the in-situ detection signal and, in the case where the in-situ detection signal indicates that the assembly is in place, allow actuation of the injection site gripper 409 to perform gripping. In this way, it is possible to avoid invalid or erroneous gripping operations, thereby saving energy consumption and improving safety.

In some embodiments, the main machine 411 may be provided with a syringe locking mechanism 405 therein, which is configured to lock and unlock the syringe 404. As an example, when the syringe 404 is to be loaded, the syringe locking mechanism 405 may be unlocked in advance, and after the syringe 404 is assembled in place, the syringe locking mechanism 405 may automatically lock it, so as to avoid the shaking of the syringe during the subsequent puncture and injection, etc., and thus improve the operation accuracy. For example, the syringe locking mechanism 405 may employ various implementations such as snap-fit, magnetic engagement, and the like.

Figure 5:
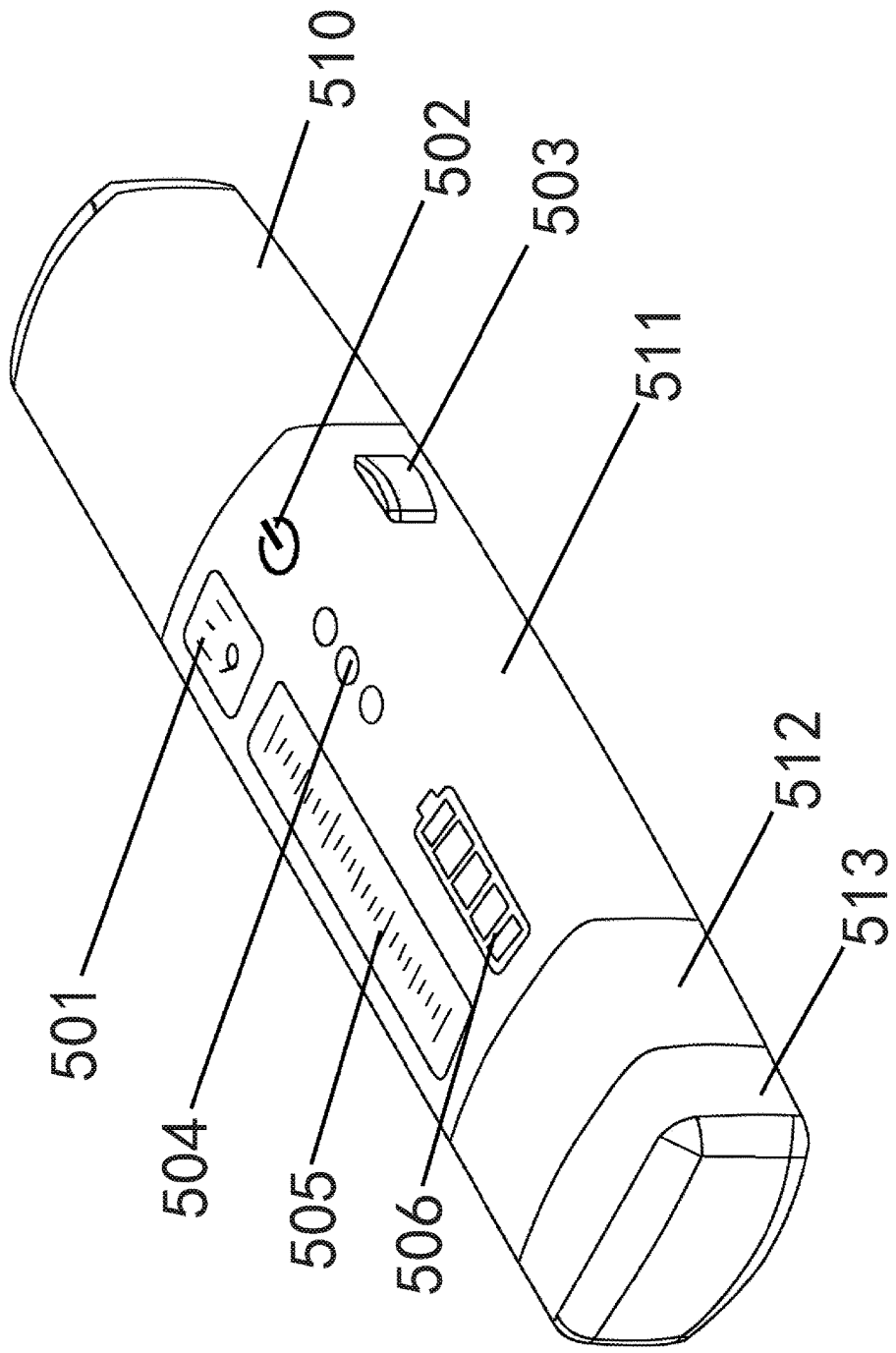
FIG. 5 shows an external schematic diagram of the injection device according to the embodiment of the present disclosure.

In some embodiments, as shown in FIG. 5, the main machine 511 may further include an injection button 503. The injection button 503 may be exposed from the outer surface of the injection device to facilitate the user's pressing operation and to send an initiation signal in response to the pressing operation. Wherein, the micro-controller unit 415 may also be configured to: actuate the dose adjustment detection mechanism 401 and the in-situ detection mechanism 407 to perform detection after receiving the initiation signal; and actuate the injection site gripper 409 to perform gripping in the case where the in-situ detection signal indicates that the assembly is in place meanwhile the dose adjustment indication signal indicates that the dose adjustment has been made. After the injection site is gripped, as described above, the micro-controller unit 415 may receive a signal from the pressure detector (not shown) indicating the magnitude of the pressure, and when the pressure is within the preset range, send the puncture drive signal to the second driving mechanism 406 and then the injection driving signal to the first driving mechanism 403, such that it possible to perform puncture and injection in the case where the injection site is subjected to appropriate pressure, so as to precisely control the puncture depth meanwhile taking into account the accuracy of the injection dose. In some embodiments, the micro-controller unit 415 may also be configured to actuate the injection site gripper 409 to perform pressure release in the case where the injection completion condition is satisfied, so as to loosen the epidermis and subcutaneous tissue at the injection site and then send the reset drive signal to the second driving mechanism 406 to drive the needle 414 to withdraw from the relaxed epidermis and subcutaneous tissue at the injection site, therefore avoiding backflow of medicament due to tension when the needle 414 is withdrawn from the tensioned injection site. Wherein, the loss due to backflow of the medicament is very considerable in the application of micromedicament such as insulin. Through the above process, the injection device can realize the complete injection process integrating automatic injection site gripping, puncture, injection and needle withdrawal in a one-click manner, which is highly user-friendly. The user only needs to adjust the dose adjustment mechanism 402 as necessary to preset the injection dose, load the syringe 404 and the needle 414 into the injection device, and then press the injection button 503. The injection device may autonomously grip the epidermis and subcutaneous tissue at the injection site and keep the pressure it bears within an appropriate range dynamically without manual intervention, while performing the puncture to an appropriate depth and then a precise injection with a preset injection dose. Consequently, the epidermis and subcutaneous tissue at the injection site may be relaxed autonomously and the needle 414 may be conveniently withdrawn therefrom. The above one-click operation is easy and convenient for the user, meanwhile significantly reducing the user's pain and reducing the waste of the medicament.

In some embodiments, the micro-controller unit 415 may further determine whether the injection site satisfies the puncturing initiation condition by responding to the initiation signal, and send the puncture driving signal to the second driving mechanism 406 only when the injection site satisfies the puncturing initiation condition. In some embodiments, the puncturing initiation condition includes at least one of the following: in the case where the injection site gripper 409 includes at least the negative pressure suction mechanism, the pressure in the injection site gripper 409 is within a preset range and can be maintained; in the case where the injection site gripper 409 includes the mechanical compression mechanism, the mechanical compression mechanism completes gripping the injection site. Especially in the case of using the mechanical compression mechanism, the mechanical compression mechanism usually uses the inward feeding of the jaws to achieve the mechanical compression, and the feeding amount may be preset. The gripping of the injection site is not completed until the feeding amount is completed. If the puncture is initiated at this time, the injection site will have less vibration and greater precision, thereby avoiding puncturing on the way of the feeding. In the case of using the negative pressure suction mechanism, the pressure of the injection site gripper 409 is maintained within a preset range for a predetermined period of time; and the tension of the subcutaneous tissue at the injection site is not too large to hinder the puncture, nor too low to cause the subcutaneous tissue to relax, which facilitates accurate and precise puncturing. in the case where the injection site gripper 409 fuses the negative pressure suction mechanism and the mechanical compression mechanism, it is possible to determine whether both the two satisfy the above-mentioned puncturing initiation conditions; and if so, it is possible to ensure that the gripped status of the injection site is ready for puncturing, and the puncturing operation may be more accurate and precise.

In some embodiments, different injection completion conditions may be set. For example; the injection completion condition may be that the dose adjustment mechanism 402 returns to the zero position (i.e., a preset injection dose has been injected), the time period during which the needle 414 resides in the subcutaneous tissue reaches a set threshold; or that needle blockage is detected, for example and without limitation, the dose adjustment mechanism 402 is stuck in some non-zero position. By taking into account abnormal injection completion conditions where the needle 414 is blocked, the needle 414 can be reset and withdrawn in the case where the needle 414 is blocked, thereby avoiding ineffective injections, waste of medicament, and the risk of persistent invalid injections when the needle 414 is blocked.

Figure 6A:
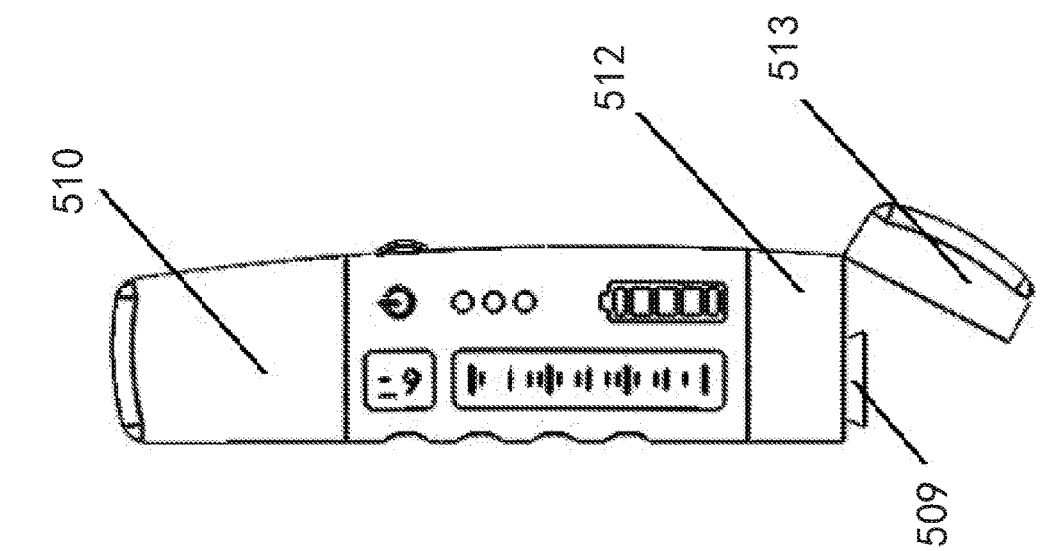
FIGS. 6(a), 6(b) and 6(c) respectively show schematic diagrams of the injection device according to the embodiment of the present disclosure when a first lid, a second lid and a third lid are removed respectively.
Figure 6B:
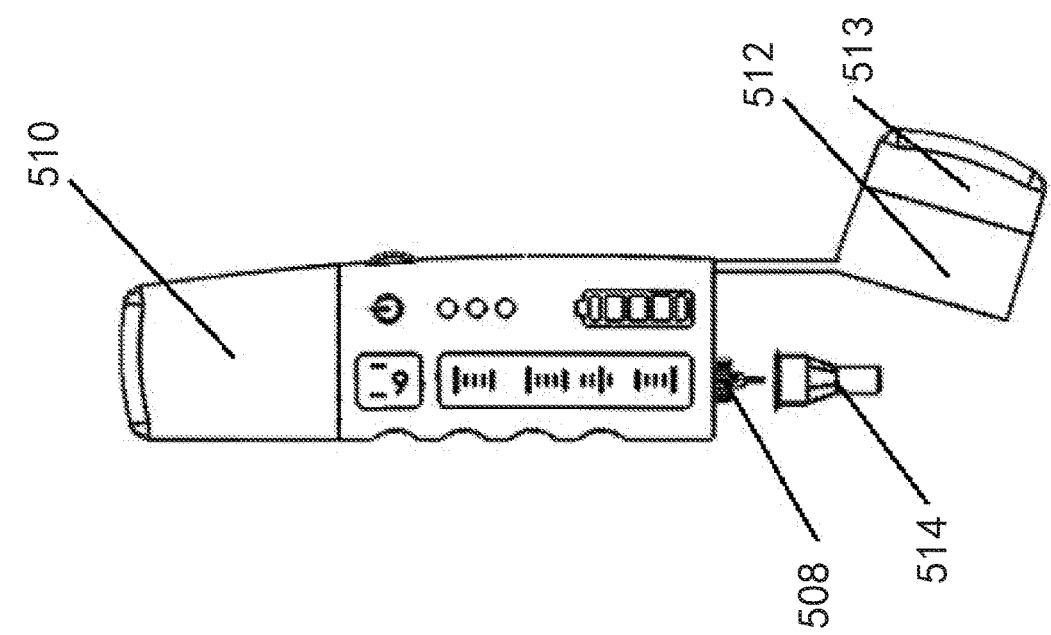
Figure 6C:
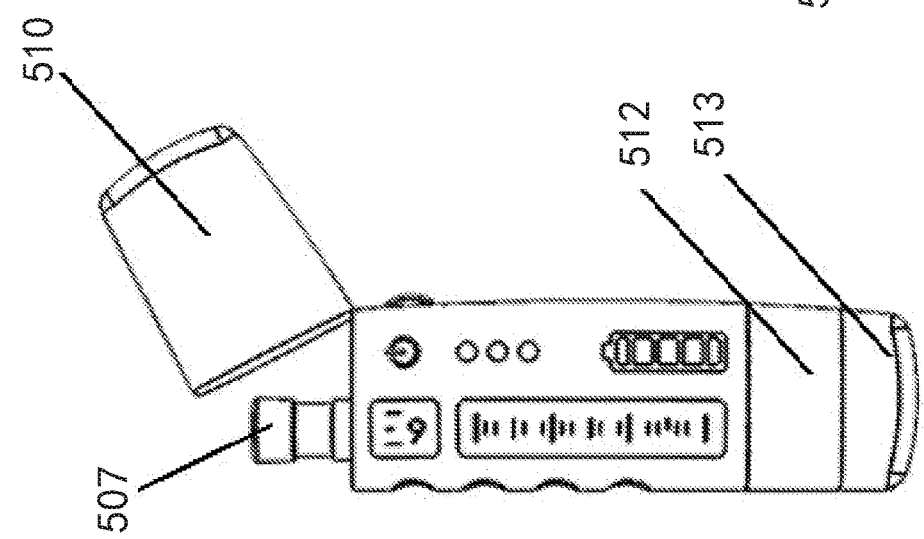

FIG. 5 shows an external schematic diagram of the injection device 500 according to the embodiment of the present disclosure. As an example, the injection device 500 is used to cooperate with the syringe and the needle; of course, the structure thereof can also be adjusted to cooperate with the injection container and the needle. As shown in FIG. 5, the injection device 500 may include a first lid 510 (identified as 410 in FIG. 4), a second lid 512 (identified as 412 in FIG. 4) and a third lid 513 (identified as 413 in FIG. 4), which are removably coupled to the main machine. Wherein, the first lid 510 may be configured to: in a detached state (e.g., an open state); load the syringe 507 into the main machine 511 (as shown in FIG. 6(a)) or take the syringe 507 out from the main machine 511. The second lid 512 is configured to load or remove the needle 508 in the detached state (e.g., the open state). When the needle 508 needs to be removed after the injection is completed, the second lid 512 may be opened (as shown in FIG. 6(b)), and a needle cap 514 may be fit (screwed or snapped) with the needle 508 as an integrate body, and then it may be unscrewed together with the needle 508 and discarded. In this way, it is possible to facilitate the loading or removal of the needle 508, especially to prevent the user from touching the needle 508 during removal, thereby improving safety and preventing the needle 508 and the residual medicine in it from polluting the environment. The third lid 513 may be configured to be detachably attached to a side of the second lid 512 opposite to the first lid 510, and to expose the accommodating portion 509 of the injection site gripper in the detached state (e.g., the open state) (as shown in FIG. 6(c)). The first lid 510, the second lid 512 and the third lid 513 can respectively encapsulate the syringe 507, the needle 508 and the injection site gripper in the closed state, so as to avoid being polluted by the external environment or polluting the external environment.

In some embodiments, referring to FIG. 4, in the case where the injection site gripper 409 includes at least the negative pressure suction mechanism (not shown), a needle sealing mechanism 408 and injection site gripper 409 may be provided inside the second lid 412, and when the second lid 412 is closed, the needle sealing mechanism 408 is coupled to the needle 414 in an airtight manner to achieve an airtight seal of the needle 414 relative to the injection site gripper 409. Therefore, when the injection site gripper 409 adopts at least the negative pressure suction mechanism, it is possible to significantly improve the use efficiency thereof.

Returning to FIG. 5, a power on/off button 502 and an injection button 503 are also provided on the outside of the injection device 500, wherein when the user presses the power on/off button 502, the injection device 500 may be turned on or off. In addition, as described above, as long as the user assembles the syringe and the needle with a set dose, and then presses the injection button 503, the injection device 500 can automatically, sequentially, precisely and smoothly perform the operations of gripping of injection site, puncture, injection, and needle withdrawal, which is easy to operate and significantly reduces the user's pain.

An injection dose window 501, a status indicator (light) 504, a dose window 505 and a battery status indicator (light) 506 may also be provided on the outside of the injection device 500. The injection dose window 501 may be used to observe whether dose adjustment has been made for the syringe as well as the adjusted injection dose. The dose window 505 may be used to observe the remaining dose in the injection container, and whether there are air bubbles, so as to judge whether it is necessary to remove the air bubbles or replace the injection container with a new one. The status indicator 504 allows the user to clearly identify which operation step the whole injection process proceeds to, syringe installation, or injection dose adjustment, or injection site gripping, etc., and/or also indicates the execution status of each operation step. Particularly, the indicator is green when the operation is successful but is red when the operation fails, and is off if the injection process has not proceeded to the operation step. The battery status indicator 506 may be used to display an installation status of a battery (whether it is installed) and/or a remaining power status of the battery. For example, when the remaining power of the battery is too low, the battery status indicator 506 may be red and flashing, indicating that the remaining power is too low to complete the injection, so as to avoid invalid injections (e.g., the injection process is interrupted due to insufficient power before completion). As another example, when no battery is installed, the battery status indicator 506 may be red to prompt the user to install the battery.

FIG. 7 shows an exemplary injection flowchart using the injection device according to the embodiment of the present disclosure. The injection process 700 starts from step 701: open the syringe detaching/loading cover, load the syringe with the injection container into the main machine of the injection device and lock it, and then close the syringe detaching/loading, cover for detaching and loading the syringe. The step 701 is usually performed when the injection device is used for the first time or when the syringe is replaced with a new injection container, otherwise it can be skipped. In some embodiments, it is necessary to align the dose display window of the syringe with the view window on the main machine of the injection device when the syringe is loaded. If the two windows are not aligned, the adjusted dose cannot be seen. Once in place, the syringe can be automatically locked with a locking mechanism.

At step 702, the needle detaching/loading cover is opened, a new needle is installed, and the needle cap is removed. Then, at step 703, the syringe detaching/loading cover is opened to complete the bubble removal operation. It can be determined whether the needle is blocked by a bubble removal operation (step 704). If so, it may return to step 702 to replace a good needle and verify that the needle is unblocked, otherwise it may proceed to the dose adjustment step 705 where the injection dose may be adjusted by the dose adjustment mechanism of the syringe, and then the syringe detaching/loading cover and the needle detaching/ loading cover may be closed (step 706).

Next, the injection site gripping step may be performed. At step 707, the injection cover is opened to expose the accommodating portion (e.g., an injection pad) of the injection site gripper. The injection pad may be placed at the injection site and an initiation injection button is pressed (step 708). After the initiation injection button is pressed, the micro-controller unit in the main machine performs a series of determinations and automatically drives the corresponding components to perform the operations of gripping, puncture, injection and needle withdrawal in sequence.

Specifically, at step 709, it is detected whether the syringe is installed in place (whether it is loaded and locked), and at step 710, it is determined whether the injection dose adjustment mechanism has completed dose adjustment. If it is detected that the syringe is not installed in place, the injection site gripping will not be activated, and a prompt message that the syringe is not installed properly will be given through the status indicator, prompting the user to reinstall the syringe. If it is detected that the dose adjustment mechanism is still in the zero position, the injection site gripping will not be activated, and the user will be prompted to adjust the injection dose through the status indicator. If it is detected that the syringe is installed in place and the dose adjustment has been completed, it continues to determine whether the needle is installed at step 711; if so, the injection pad is driven to pressurize to grip the epidermis and subcutaneous tissue at the injection site.

At step 713, it is determined whether the injection site is gripped. Specifically, the pressure in the injection pad may be detected by a pressure sensor. When the pressure is within an appropriate range, it is determined that the injection site has been gripped; if not, the pressure in the injection pad is adjusted until it is in the appropriate range, therefore achieving gripping of the injection site. Next, at step 714, the pressurization is stopped, the pressure in the injection pad applied to the injection site is maintained as substantially constant, and the syringe is driven to complete the puncture and injection. Specifically, after the injection site is gripped, the micro-controller unit of the injection device may issue a puncture command to the syringe driving mechanism, so as to drive the needle to puncture into the subcutaneous tissue at a very fast speed; then, the injection driving mechanism inside the syringe detaching/loading cover is activated to perform the injection smoothly until the dose adjustment mechanism of the syringe is pushed to the zero position to complete the injection of the preset dose.

After the injection is complete, the needle remains in the subcutaneous tissue for a few seconds and the pressure applied to the injection site is released (step 715). At step 716, the syringe driving mechanism pushes the syringe to withdraw the needle and reset the syringe. At step 717, the injection device may be removed from the injection site, the injection cap is closed, the needle detaching/loading cover is opened, and the needle cap is installed onto the needle, thereby unscrewing the needle together with the needle cap and throwing it into the waste container. Next, at step 718, the needle detaching/loading cover is closed, and the injection device is accommodated, thereby completing an injection operation.

Figure 8:
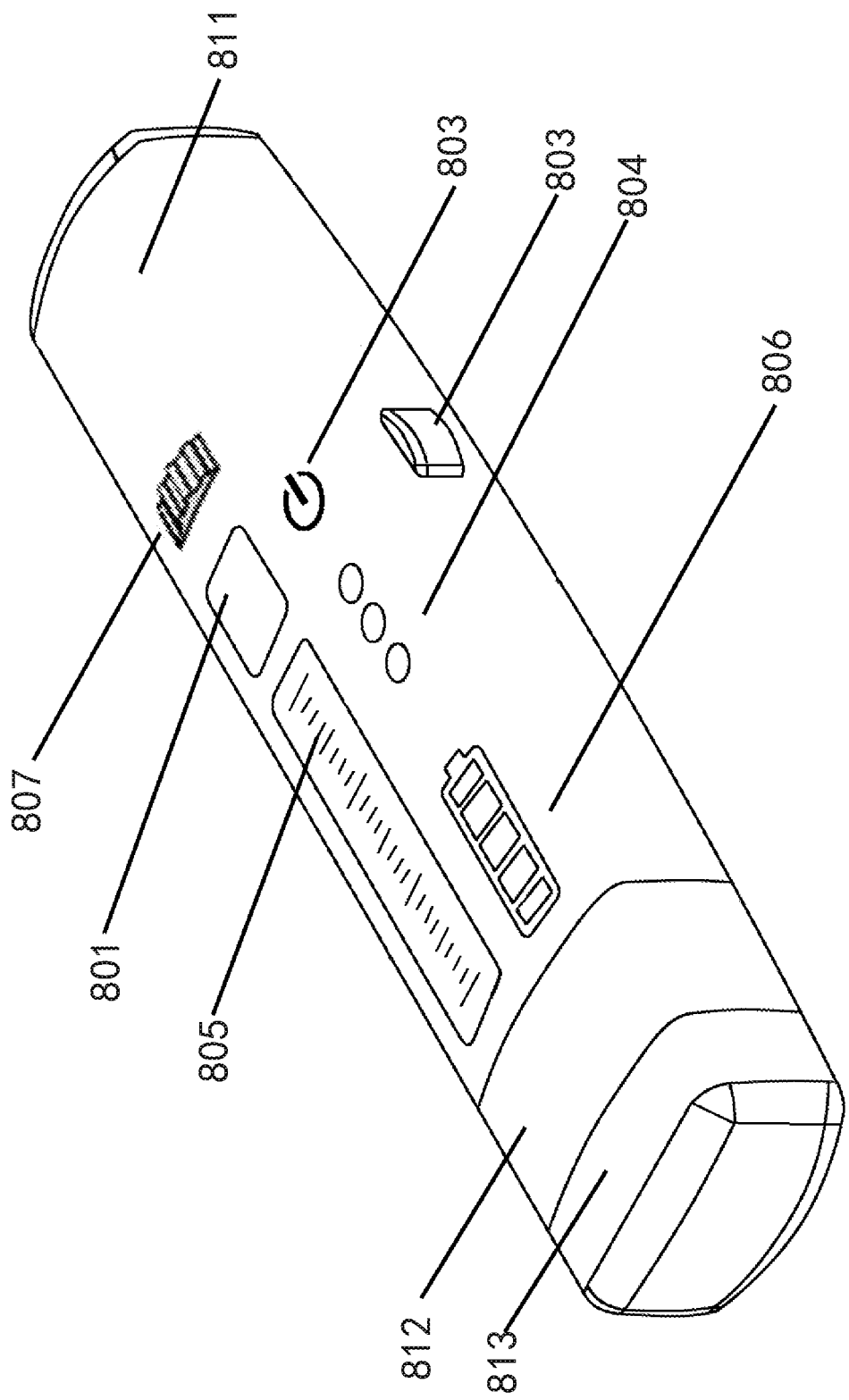
FIG. 8 shows an external schematic view of the injection device according to the embodiment of the present disclosure.

FIG. 8 shows an external schematic view of an injection device 800 according to an embodiment of the present disclosure, wherein the injection device 800 is used in conjunction with an injection container and a needle. As shown in FIG. 8, the main machine 811 of the injection device 800 may include a power on/off button 802, an injection button 803, an injection dose window 801, a status indicator 804, a dose window 805 and a battery status indicator 806. The structures and functions of the above components are similar to those of the power on/off button 502, the injection button 503, the injection dose window 501, the status indicator 504, the dose window 505 and the battery status indicator 506 of the main machine 511 of the injection device 500 in FIG. 5, which is not repeated herein.

Different from the injection device 800 shown in FIG. 5, the injection dose adjustment mechanism 807 is not provided by the syringe, but is provided inside the main body 811 and exposed a part from the casing of the main body 811, so that it may be easily rotated and adjusted by the user from the outside of the main machine 811. Additionally, the injection device 800 may include two lids, that is, a second lid 812 and a third lid 813. The second lid 812 is used for disassembly and assembly of both the injection container and the needle. The structure and function of the third lid 813 are similar to those of the third lid 513 in FIG. 5, which is not repeated herein.

Figure 9:
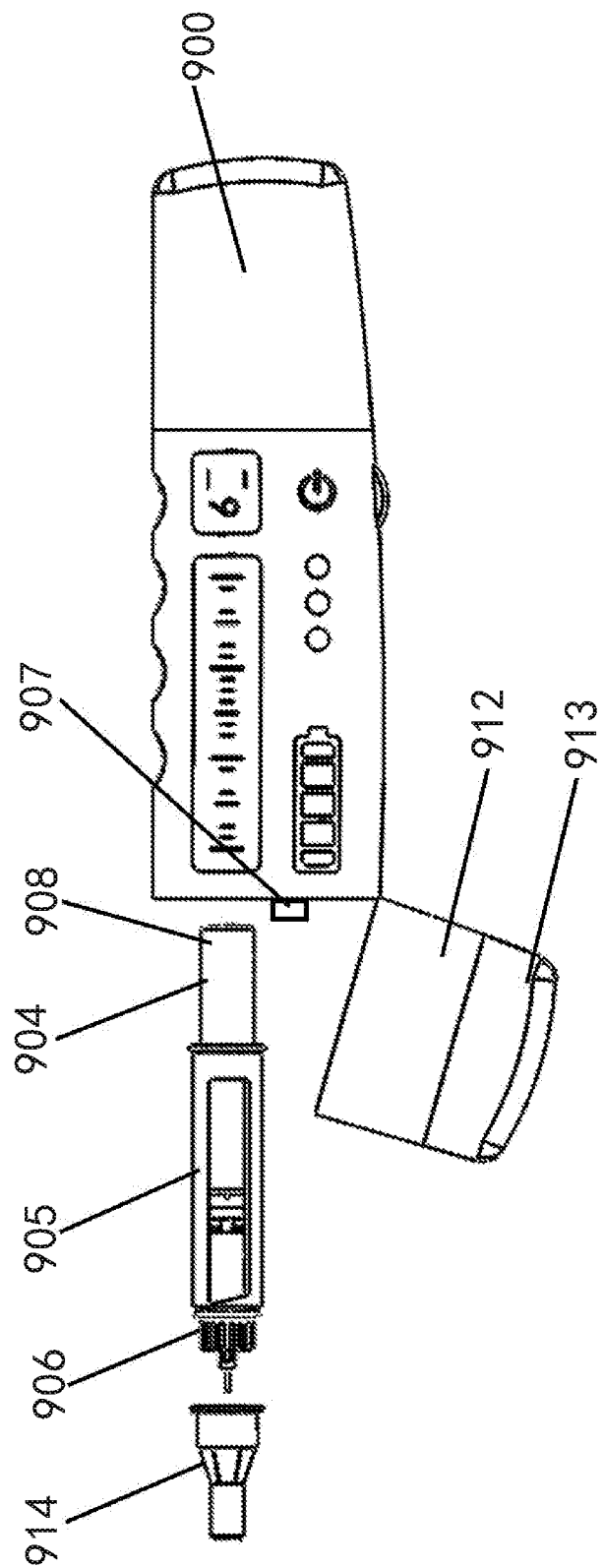
FIG. 9 shows a schematic diagram of how the injection device according to the embodiment of the present disclosure assembles an injection container and a needle.

FIG. 9 shows a schematic view of how an injection device 900 according to an embodiment of the present disclosure assembles an injection container 904 and a needle 906. As shown in FIG. 9, the injection device 900 may include a second lid 912 and a third lid 913 that are detachably (e.g., may be opened or closed) coupled to the main machine (not shown). The second lid 912 may be configured to load or detach the injection container 904 and the needle 906 in a detached (opened) state. The third lid 913 may be configured to be detachably coupled to a side of the second lid 912 opposite to the main machine, and to expose the accommodating portion of the injection site gripper in the detached state (not shown, similar to that shown in FIG. 6(c)).

A detachable injection container holder 905 may be provided in the injection device 900. It is possible to open the second lid 912 and the third lid 913, take out the injection container holder 905, assemble the injection container 904 into the injection container holder 905, and reinsert the injection container holder 905 containing the injection container 904 into the injection device 900 and lock it. As an example, a gripping mechanism and/or locking mechanism for the injection container holder 905 may be provided within the main machine of the injection device 900 to facilitate gripping and/or locking of the injection container holder 905. In some embodiments, the injection device 900 may be provided with an in-situ detection mechanism 907 configured to detect whether the injection container holder 905 and the needle 906 are in place; if so and the injection dose is preset and the injection site is gripped properly, it is then possible to drive the needle 906 to perform the puncture, then drive a piston in the injection container 904 to perform the injection with the preset dose, drive the injection container holder 905 to pull out the needle after the injection is complete, and so on. In some embodiments, a piston 908 may be provided on the injection container 904. The injection driving mechanism may push the piston 908 to perform the injection and may be coupled to the injection dose adjustment mechanism and the piston 908 within the injection container 904. As the injection driving mechanism pushes the piston 908, the injection dose adjustment mechanism rotates a corresponding scale toward the zero position, and just returns to the zero position when the injection is completed.

Figure 10:
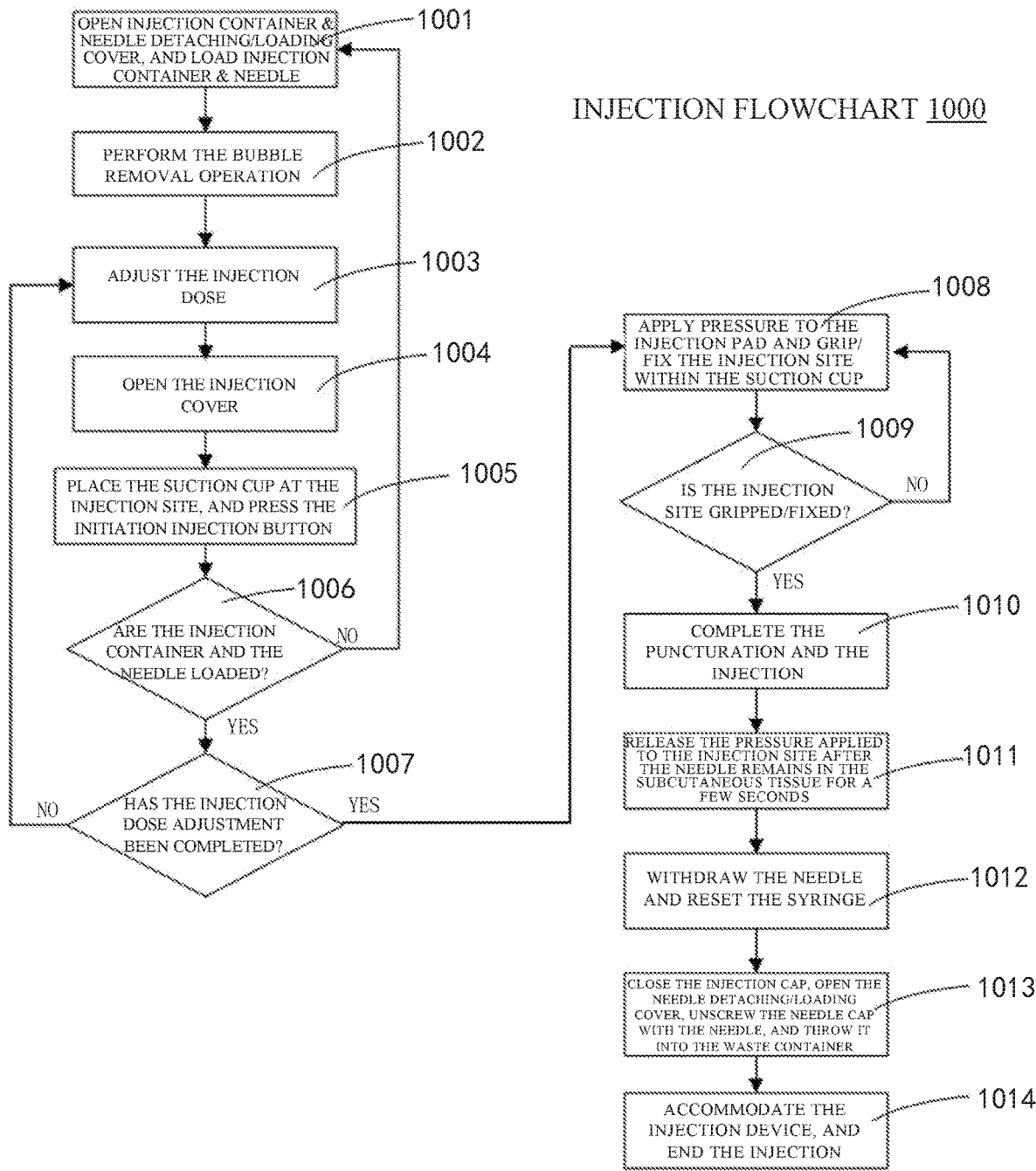
FIG. 10 shows an exemplary injection flowchart using the injection device according to the embodiment of the present disclosure.

FIG. 10 shows a flowchart of an exemplary injection flowchart 1000 using the injection device according to the embodiment of the present disclosure. As shown in FIG. 10, the injection process 1000 starts from step 1001: open the injection container and the needle detaching/loading cover. If the injection container has not been installed, the injection container needs to be installed first, and then the needle may be installed on the injection container; if the injection container has been installed, only the new needle needs to be installed. At step 1002, a bubble removal operation may be performed to ensure that the needle is not blocked. At step 1003, after the bubble removal operation is completed, the needle detaching/loading cover may be closed, and then the injection dose may be adjusted by the dose adjustment mechanism to preset the dose to be injected.

At step 1004, opening the injection cover so as to expose the accommodating portion of the injection site gripper. Here, an example of exposing the suction cup as the accommodating portion will be described. At step 1005, it is possible to place the suction cup at the injection site, press the initiation injection button, and then the micro-controller unit in the injection device may automatically control the entire process including gripping, puncture, injection and needle withdrawal.

Specifically, after pressing the initiation injection button, at first it may detect whether the injection container and the needle are installed in place (step 1006), and whether the injection dose adjustment is completed (step 1007). If it is detected that the injection container and needle are not installed in place, the injection site gripping will not be activated, and a prompt message that the injection container and needle are not installed in place will be given through the status indicator, prompting the user to reinstall the injection container and needle. If it is detected that the injection dose adjustment has not been completed, the injection site gripping will not be activated, and the user will be prompted to adjust the injection dose through the status indicator. If it is determined that the injection container and the needle are in place and the injection dose adjustment has been completed, the injection site gripper will be actuated to grip the epidermis and subcutaneous tissue at the injection site. For example, pressure may be applied to an injection pad (which may be implemented as a suction cup) to compress and grip the epidermis and subcutaneous tissue at the injection site in the suction cup (see step 1008). Whether the pressure on the epidermis and subcutaneous tissue in the suction cup is within an appropriate range may be detected by the pressure sensor. If so, it is determined that the injection site is gripped ready (see step 1009); if not, the pressure applied to the injection site gripper may be adjusted sequentially until the pressure is within the appropriate range and the appropriate pressure may be maintained for subsequent operations.

For example, at step 1010, the micro-controller unit of the injection device may issue a puncture instruction to an injection container driving mechanism. Since the injection container and the needle are assembled as one, the injection container driving mechanism may drive the injection container together with the needle to penetrate into the subcutaneous tissue at a very high speed, and then issue an injection instruction to the injection driving mechanism, which may push the piston on the injection container to inject a preset dose of medicament into the subcutaneous tissue.

After completing the injection, the needle may remain in the subcutaneous tissue for a few seconds before releasing the pressure applied to the injection site (step 1011). Next, the micro-controller unit of the injection device may issue a needle withdrawal instruction to the injection container driving mechanism which may drive the injection container and the needle to withdraw the needle, and reset the injection container and the needle (step 1012).

Next, the injection device may be removed from the injection site, the injection cover may be closed, the needle detaching/loading cover may be opened, and the needle cap may be closed so as to snap, for example, with the needle. Then, it may be convenient to grasp the needle cap so as to remove it together with the used needle, and then throw them into the waste storage box (step 1013). In this way, the injection device may be stored and the injection is completed.

In addition, although exemplary embodiments have been described herein, the scope thereof includes any and all embodiments based on the present disclosure having equivalent elements, modifications, omissions, combinations (e.g., scenarios where various embodiments intersect), adaptations, or changes. The elements of the claims will be construed broadly based on the language employed in the claims and are not limited to the examples described in this specification or during implementation of this application, the examples of which will be construed as non-exclusive. Accordingly, this specification and the examples are intended to be considered as examples only and the true scope and spirit is indicated by the full scope of the following claims and their equivalents.

The above-mentioned description is intended to be illustrative and not limiting. For example, the above-mentioned examples (or one or more embodiments thereof) may be used in combination with each other. For example, those of ordinary skill in the art may use other embodiments when reading the above-mentioned description. In addition, in the above-mentioned specific embodiments, various features may be grouped together to simplify the present disclosure. This should not be interpreted as an intention that features of the disclosure that do not require protection are necessary for any of the claims. Rather, the subject matter of the present disclosure may be less than the full range of features of a particular disclosed embodiment. Thereby, the following claims are incorporated herein as examples or embodiments in the particular embodiment, wherein each claim stands alone as a separate embodiment, and it is contemplated that these embodiments may be combined with each other in various combinations or permutations. The scope of the present disclosure shall be determined by reference to the full scope of the appended claims and equivalent forms of these claim assignments.

The above-mentioned embodiments are only exemplary embodiments of the present disclosure, and are not used to limit the present disclosure. The scope of protection of the disclosure is defined b the claims. Those skilled in the art can make various modifications or equivalent substitutions to the disclosure within the essence and protection scope of the disclosure, and such modifications or equivalent substitutions should also be regarded as falling within the protection scope of the disclosure.

What is claimed is:

1. An injection device configured to be loaded with a syringe including an injection container and a needle, or loaded with an injection container and a needle, wherein, the injection device comprises:
    an injection site gripper, comprising:
        at least one of a negative pressure suction mechanism and a mechanical compression mechanism;
        an accommodating portion configured to be disc-shaped, have an arched cross-section, raise and grip epidermis and subcutaneous tissue at an injection site by the at least one of the negative pressure suction mechanism and the mechanical compression mechanism, and provided with an opening to expose at least a portion of the raised and gripped epidermis and subcutaneous tissue at the injection site;
        a height restriction portion configured to have a transversal extending portion, the opening of the accommodating portion being located inside of the transversal extending portion, so that a height of the exposed at least portion of the epidermis and subcutaneous tissue at the injection site is lower than that of the transversal extending portion, wherein the needle is only able to actively penetrate into the epidermis and subcutaneous tissue to an appropriate depth, instead of passively penetrating therein when the epidermis and subcutaneous tissue is raised;
    a main machine, which is coupled to the injection site gripper and configured to automatically perform an injection process for the gripped injection site; and
    a pressure detector configured to detect a pressure applied by the injection site gripper on the injection site.

2. The injection device of claim 1, wherein, the main machine further comprises a micro-controller unit configured to receive a signal from the pressure detector indicating magnitude of the pressure, and send a pressure maintenance signal to the injection site gripper when the pressure is within a preset range.

3. The injection device of claim 1, wherein, when the injection site gripper comprises at least the negative pressure suction mechanism, the injection device further comprises a needle sealing mechanism configured to seal between the needle and the injection site gripper.

4. The injection device of claim 1, wherein, the main machine further comprises:
a first driving mechanism configured to drive an injection in response to an injection driving signal;
a second driving mechanism configured to drive the needle to puncture the injection site in response to a puncture driving signal; and
a micro-controller unit, which is configured to: receive a signal from the pressure detector indicating magnitude of the pressure, and when the pressure is in a preset range, send the puncture driving signal to the second driving mechanism and then the injection driving signal to the first driving mechanism.

5. The injection device of claim 4, wherein, the syringe is provided with a dose adjustment mechanism or the main machine is provided with a dose adjustment mechanism, and the main machine further comprises:
a dose adjustment detection mechanism configured to detect a status of the dose adjustment mechanism and send a corresponding dose adjustment indication signal; and
wherein, the micro-controller unit is further configured to receive the dose adjustment indication signal, and allow actuation of the injection site gripper to perform gripping when the dose adjustment indication signal indicates that a dose adjustment has been made.

6. The injection device of claim 5, wherein, the first driving mechanism is coupled to the dose adjustment mechanism provided on the syringe or the main machine, and the status of the dose adjustment mechanism includes whether the dose adjustment has been made, whether the needle is blocked, and whether the dose adjustment mechanism is pushed back to a zero position.

7. The injection device of claim 5, wherein, the main machine further comprises:
an in-situ detection mechanism configured to detect whether the syringe and the needle are assembled in place when the injection device is configured to be loaded with the syringe and the needle, detect whether the injection container and the needle are assembled in place when the injection device is configured to be loaded with the injection container and the needle, and send a corresponding in-situ detection signal; and
an injection button configured to send an initiation signal when pressed,
wherein, the micro-controller unit is further configured to actuate the dose adjustment detection mechanism and the in-situ detection mechanism to perform detection upon receiving the initiation signal, and actuate the injection site gripper to perform gripping when the in-situ detection signal indicates that the assembly is in place meanwhile the dose adjustment indication signal indicates that a dose adjustment has been made.

8. The injection device of claim 5, wherein, the second driving mechanism is further configured to drive the needle to reset in response to a reset driving signal;
wherein the micro-controller unit is further configured to actuate the injection site gripper to perform release when an injection end condition is satisfied, and then send the reset driving signal to the second driving mechanism.

9. The injection device of claim 8, wherein, the injection end condition includes injection success complete condition and injection failure terminate condition,
wherein the injection success complete condition includes at least one of the following: the dose adjustment mechanism returns to a zero position after completing the injection of set dose; the time period during which the needle resides in the subcutaneous tissue reaches a set threshold;
wherein the injection failure terminate condition includes at least one of the following: the injection of set dose is terminated due to the blockage of the needle or lack of the residual medicament, grip failure at the injection site during injection.

10. The injection device of claim 4, wherein, the main machine further comprises:
an in-situ detection mechanism, which is configured to detect whether the syringe and the needle are assembled in place when the injection device is configured to be loaded with the syringe and the needle, detect whether the injection container and the needle are assembled in place when the injection device is configured to be loaded with the injection container and the needle, and send a corresponding in-situ detection signal,
wherein, the micro-controller unit is configured to receive the in-situ detection signal and allow to actuate the injection site gripper to perform gripping when the in-situ detection signal indicates that the assembly is in place.

11. The injection device of claim 1, wherein, the main machine further comprises:
a first driving mechanism configured to drive an injection in response to an injection driving signal;
a second driving mechanism configured to drive the needle to puncture into the injection site in response to a puncture driving signal;
an injection button configured to send an initiation signal when pressed; and
a micro-controller unit configured to send the puncture driving signal to the second driving signal in response to the initiation signal when the injection site satisfies a puncture initiation condition.

12. The injection device of claim 11, wherein, the puncture initiation condition includes at least one of the following:
when the injection site gripper comprises at least a negative pressure suction mechanism, pressure within the injection site gripper is within a preset range and be able to be maintained; or
when the injection site gripper comprises only a mechanical compression mechanism, the mechanical compression mechanism completes the gripping of the injection site.

13. The injection device of claim 1, wherein, when the injection device is configured to be loaded with the syringe and the needle, further comprising a first lid, a second lid and a third lid each detachably coupled to the main machine, wherein:
the first lid is configured to load the syringe into the main machine in a detached state;
the second lid is configured to load or remove the needle in the detached state; and
the third lid is configured to be detachably coupled to a side of the second lid opposite the first lid, and to expose the accommodating portion of the injection site gripper in the detached state.

14. The injection device of claim 13, wherein, when the injection site gripper comprises at least the negative pressure suction mechanism, the second lid is provided a needle sealing mechanism and the injection site gripper therein, and when closing the second lid, the needle sealing mechanism is air-tightly coupled to the needle so as to achieve an airtight seal of the needle relative to the injection site gripper.

15. The injection device of claim 1, wherein, when the injection device is configured to be loaded with the injection container and the needle, the injection device further comprises a second lid and a third lid detachably coupled to the main machine, wherein:
the second lid is configured to load or remove the injection container and the needle in a detached state; and
the third lid is configured to be detachably coupled to a side of the second lid opposite the main machine, and to expose the accommodating portion of the injection site gripper in the detached state.

16. The injection device of claim 15, wherein, when the injection site gripper comprises at least the negative pressure suction mechanism, the second lid is provided a needle sealing mechanism and the injection site gripper therein, and when closing the second lid, the needle sealing mechanism is air-tightly coupled to the needle so as to achieve an airtight seal of the needle relative to the injection site gripper.

17. An injection device configured to be loaded with a syringe including an injection container and a needle, or loaded with an injection container and a needle, wherein, the injection device comprises:

an injection site gripper configured to grip tissue at an injection site; and
a main machine coupled to the injection site gripper and configured to automatically perform an injection process for the gripped injection site, the main machine including:
a first driving mechanism configured to drive an injection in response to an injection driving signal;
a second driving mechanism configured to drive the needle to puncture the injection site in response to a puncture driving signal; and
a micro-controller unit configured to receive a signal from the pressure detector indicating magnitude of the pressure, and when the pressure is in a preset range, send the puncture driving signal to the second driving mechanism and then the injection driving signal to the first driving mechanism.

18. The injection device of claim 17, wherein the syringe is provided with a dose adjustment mechanism or the main machine is provided with a dose adjustment mechanism, and the main machine further comprises:

a dose adjustment detection mechanism configured to detect a status of the dose adjustment mechanism and send a corresponding dose adjustment indication signal; and
wherein, the micro-controller unit is further configured to receive the dose adjustment indication signal, and allow actuation of the injection site gripper to perform gripping when the dose adjustment indication signal indicates that a dose adjustment has been made.

19. The injection device of claim 17, wherein the main machine further comprises:
an in-situ detection mechanism, which is configured to detect whether the syringe and the needle are assembled in place when the injection device is configured to be loaded with the syringe and the needle, detect whether the injection container and the needle are assembled in place when the injection device is configured to be loaded with the injection container and the needle, and send a corresponding in-situ detection signal,
wherein, the micro-controller unit is configured to receive the in-situ detection signal and allow to actuate the injection site gripper to perform gripping when the in-situ detection signal indicates that the assembly is in place.

* * * * *